US010416851B2

(12) United States Patent
Battles et al.

(10) Patent No.: US 10,416,851 B2
(45) Date of Patent: *Sep. 17, 2019

(54) ELECTRONIC PUBLISHING MECHANISMS

(71) Applicant: Amazon Technologies, Inc., Reno, NV (US)

(72) Inventors: Matthew Hamilton Battles, Palo Alto, CA (US); Pradeep Desai, Karnataka (IN); Balaji Hariharan Chandra, Tamil Nadu (IN); Prasanth Radhakrishnan, Karnataka (IN); Harshit Beri, Haryana (IN); Gaurav Gupta, Rajasthan (IN); Vignesh Annamalai Paramadhayalan, Tamil Nadu (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 355 days.

This patent is subject to a terminal disclaimer.

(21) Appl. No.: 15/409,140

(22) Filed: Jan. 18, 2017

(65) Prior Publication Data

US 2017/0123616 A1 May 4, 2017

Related U.S. Application Data

(63) Continuation of application No. 13/865,820, filed on Apr. 18, 2013, now Pat. No. 9,582,156.

(51) Int. Cl.
*G06F 3/0484* (2013.01)
*G06Q 30/02* (2012.01)

(52) U.S. Cl.
CPC ....... *G06F 3/0484* (2013.01); *G06Q 30/0251* (2013.01); *G06Q 30/0271* (2013.01); *G06Q 30/0277* (2013.01)

(58) Field of Classification Search
CPC .................................................. G06F 3/0484
See application file for complete search history.

(56) References Cited

U.S. PATENT DOCUMENTS

| 7,788,590 B2 * | 8/2010 | Taboada ................. G06F 9/451 715/761 |
| 7,992,085 B2 * | 8/2011 | Wang-Aryattanwanich ................ G06F 16/9558 715/711 |

(Continued)

FOREIGN PATENT DOCUMENTS

| EP | 2357599 | 8/2011 |
| EP | 2915120 | 9/2015 |
| WO | 2014070249 | 5/2014 |

OTHER PUBLICATIONS

European Examination Report issued in EP Application No. 13852283.4 dated Jun. 13, 2018.

(Continued)

*Primary Examiner* — David E Choi
(74) *Attorney, Agent, or Firm* — Hogan Lovells US LLP

(57) ABSTRACT

A content publisher can use a publisher tool to tag various content elements, which enables a user viewing content from the publisher to view related advertising. In at least some embodiments, the tool is a toolbar that the publisher can use to tag content elements such as images and text, whereby the toolbar can recommend related items to be linked to those content elements. The items can be associated with an entity, such as an advertiser or electronic retailer, that will provide some level of compensation to the publisher in return for the linking. Such an approach enables the publisher to monetize the content in a way that is minimally intrusive for the end user.

20 Claims, 10 Drawing Sheets

(56) References Cited

U.S. PATENT DOCUMENTS

| | | | | |
|---|---|---|---|---|
| 8,078,615 | B2* | 12/2011 | Smith | G06F 16/9535 707/732 |
| 8,826,150 | B1* | 9/2014 | Ainslie | H04W 4/21 715/753 |
| 2003/0137536 | A1* | 7/2003 | Hugh | G06F 9/451 715/744 |
| 2006/0026147 | A1* | 2/2006 | Cone | G06F 16/9535 |
| 2006/0036966 | A1* | 2/2006 | Yevdayev | G06F 16/954 715/779 |
| 2006/0282416 | A1* | 12/2006 | Gross | G06F 16/951 |
| 2007/0043583 | A1 | 2/2007 | Davulcu et al. | |
| 2009/0198566 | A1* | 8/2009 | Greenberg | G06Q 30/02 707/727 |
| 2009/0327889 | A1* | 12/2009 | Jeong | G06F 16/954 715/706 |
| 2010/0080470 | A1* | 4/2010 | Deluca | G06K 9/00664 382/209 |
| 2011/0161318 | A1 | 6/2011 | Lyon et al. | |
| 2012/0124487 | A1* | 5/2012 | Edgar | G06Q 10/10 715/760 |
| 2012/0151398 | A1* | 6/2012 | Foy | G06F 16/5866 715/769 |
| 2012/0254021 | A1* | 10/2012 | Wohied | G06Q 20/10 705/39 |
| 2012/0271805 | A1* | 10/2012 | Holenstein | G06F 16/955 707/706 |
| 2012/0290927 | A1* | 11/2012 | Sokolan | G06F 16/353 715/255 |
| 2013/0055104 | A1* | 2/2013 | Everinghann | G06F 17/241 715/751 |
| 2013/0073473 | A1* | 3/2013 | Heath | G06Q 30/02 705/319 |
| 2014/0067542 | A1* | 3/2014 | Everingham | G06Q 30/0241 705/14.64 |
| 2014/0108958 | A1* | 4/2014 | Toepper | G06F 16/48 715/753 |
| 2014/0129959 | A1* | 5/2014 | Battles | G06F 3/0484 715/751 |

OTHER PUBLICATIONS

International Preliminary Report on Patentability issued in corresponding International Application No. PCT/US2013/043789 dated May 5, 2015.
PCT International Search Report and Written Opinion issued in PCT Application No. PCT/US2013/043789 dated Jan. 3, 2014.
Zammit, "Houzz interior design App review for iPhone", Youtube video, Feb. 13, 2012, https://www.youtube.com/watch?v=SD2xsdAC6K0.
Non-Final Rejection dated Feb. 12, 2015 issued in U.S. Appl. No. 13/865,820.
Final Rejection dated May 7, 2015 issued in U.S. Appl. No. 13/865,820.
Non-Final Rejection dated Aug. 14, 2015 issued in U.S. Appl. No. 13/865,820.
Final Rejection dated Nov. 30, 2015 issued in U.S. Appl. No. 13/865,820.
Non-Final Rejection dated May 4, 2016 issued in U.S. Appl. No. 13/865,820.
Final Rejection dated Aug. 11, 2016 issued in U.S. Appl. No. 13/865,820.
Notice of Allowance dated Oct. 25, 2016 issued in U.S. Appl. No. 13/865,820.

* cited by examiner

ELECTRONIC PUBLISHING MECHANISMS

CROSS-REFERENCE TO RELATED APPLICATIONS

This application is a continuation of U.S. patent application Ser. No. 13/865,820, filed on Apr. 18, 2013, entitled "ELECTRONIC PUBLISHING MECHANISMS," which application claims priority from India Provisional Patent Application No. 3390/DEL/2012, filed Nov. 2, 2012, entitled "ELECTRONIC PUBLISHING MECHANISMS," which are incorporated herein by reference in their entirety for all purposes.

BACKGROUND

Users are increasingly utilizing electronic devices to access content, such as news articles, product reviews, and the like. Oftentimes, the publishers of the content would like to be able to offer advertising or other sponsored elements that enable the publishers to monetize the content, whereby the providers can continue to offer the content to users. In many instances, however, excessive advertising displayed with content can degrade the user experience, and keep users from viewing the content. A problem exists, then, with how to best enable content publishers or providers to obtain payment for the providing of the content in a way that is not overly intrusive to users viewing that content.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to providing advertising or sponsored content in an electronic environment. In particular, various approaches enable content publishers to tag various content elements and associate those elements with products or advertising, enabling those publishers to monetize content in a way that is less intrusive than other, conventional approaches.

Various other functions and advantages are described and suggested below as may be provided in accordance with the various embodiments.

Figure 1:
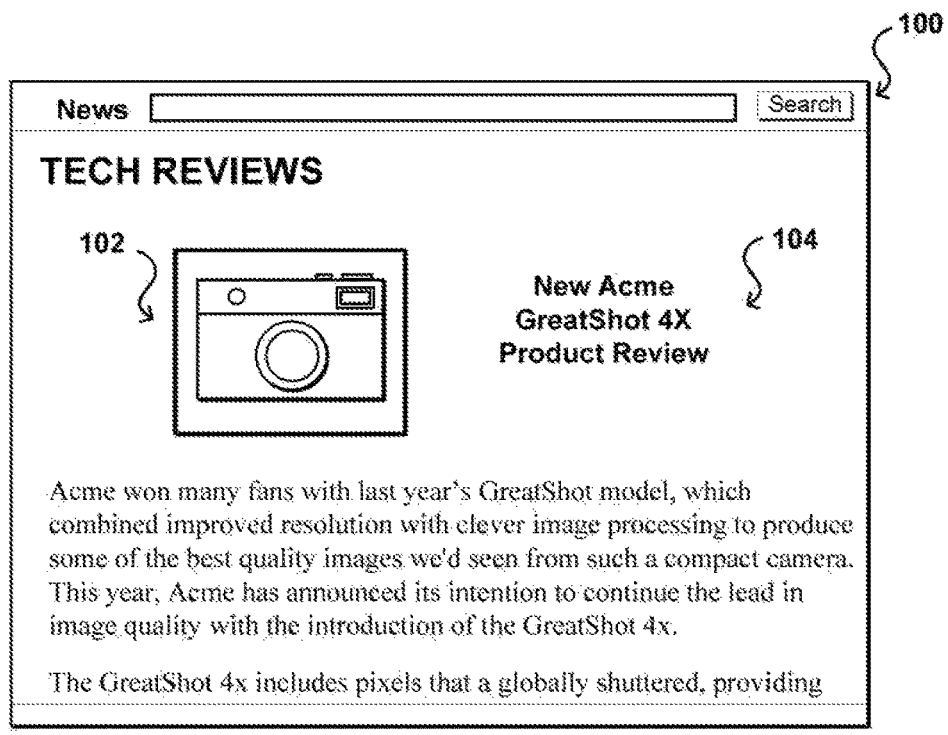
FIG. 1 illustrates example content that can be displayed to a user in accordance with various embodiments.

FIG. 1 illustrates an example interface 100 that can be presented to a user accessing content using a computing device. In this example, the computing device is displaying content for a review of a product offered through a Web site, although various other displays of content can be provided as well. In this example, the content includes a least one image 102 of the product being viewed and textual content 104, as may include an article, title, description, and other such information. Various other elements of content can be provided as well.

As mentioned, the article can be provided by an entity such as a publisher or content provider, and the article can be accessed through any of a number of potential sites, portals, or other such interfaces. In order to obtain compensation for providing the content, the provider in some instances can charge for the content. As is utilized in many situations, however, a provider can prefer to offer advertising to help pay for the providing of the content. Conventional approaches could cause a banner ad or other static advertising to be displayed with the content in the view of FIG. 1. Including too much advertising in such a situation can degrade the user experience, and cause the user to be less interested in viewing the content or subsequently accessing additional content from that provider.

Accordingly, approaches in accordance with various embodiments provide mechanisms that enable content providers or other such entities to include advertising in content in a way that is minimally intrusive. In some embodiments a publisher toolkit is provided that enables entities to perform tasks such as link building, advertising placement, and performance analysis. Such a toolkit can simplify the process, enabling publishers or other entities to more easily monetize their content.

Figure 2:
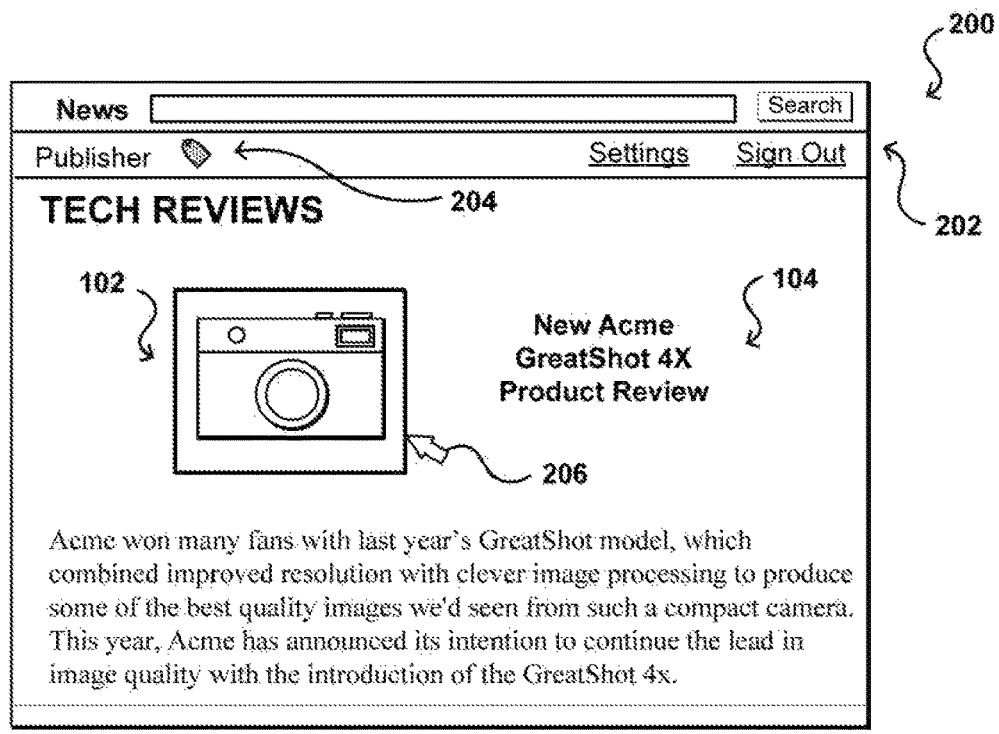
FIG. 2 illustrates an interface including a publishing bar enabling the publisher to tag content elements in the example content.

FIG. 2 illustrates an example interface view 200 that can be presented to a content provider or other such entity in accordance with various embodiments. In this example, the provider can login to the system or service from which the content is provided for display, such as a Web site or electronic marketplace. The service, for example, can determine that the entity is a content provider and can cause a publisher toolbar 202 to be displayed with the content. Although text or Web page style content is shown, it should be understood that video content, in-application content, or other content can be utilized as well within the scope of the various embodiments. In some embodiments, this can include providing JavaScript or other code or script that can be executed in a browser or other such application. The toolbar 202 can contain various options, such as an option 204 to tag a content element for advertising or other related data. In this example, the user can select the tag element 204 and then select an element of the content, such as the image 102 or a portion of the text 104, among other potential elements or groups of elements. In this example, the user selects the image 102 using a cursor 206, touch screen input, or other such mechanism known or used for selecting interface elements on a computing device.

Figure 3A:
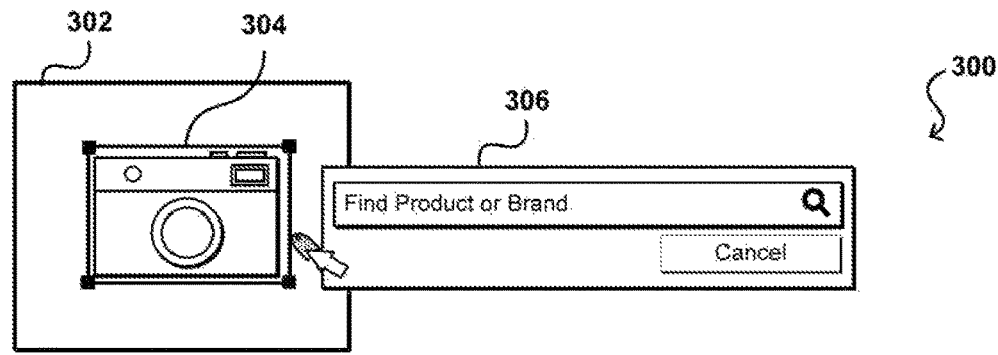
FIGS. 3(a), 3(b), and 3(c) illustrate an example process for tagging a content element that can be used in accordance with various embodiments.
Figure 3B:
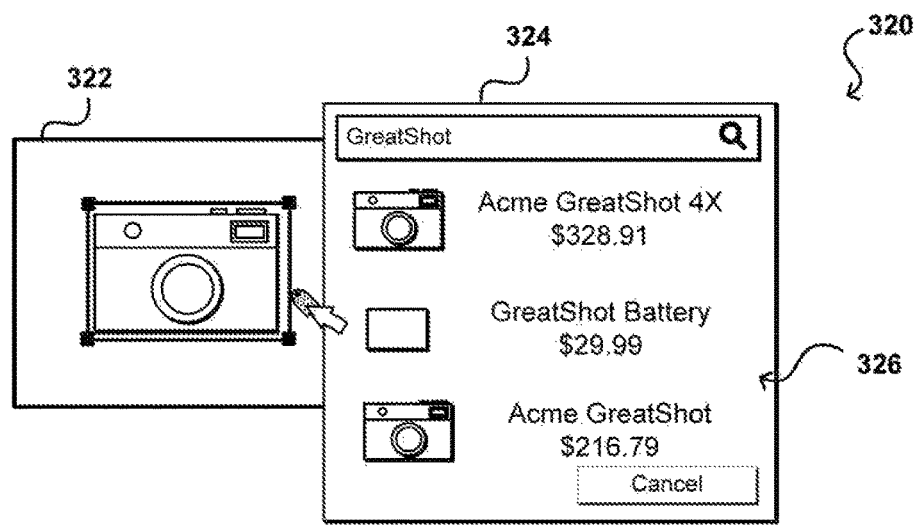
Figure 3C:
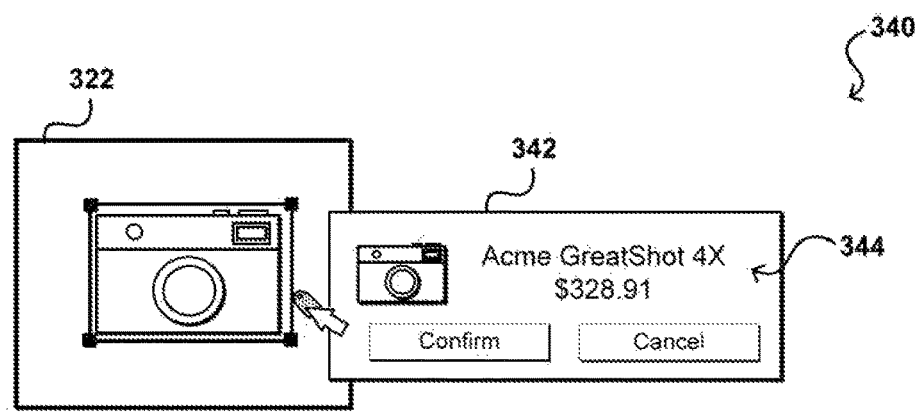

The user can select the image, or an item displayed in the image. In either case, a process can be used to attempt to identify the object of interest in the image 302 and attempt to define a bounding box 304 for that item, as illustrated in the situation 300 of FIG. 3(*a*). The bounding box can be editable or adjustable by the user, in order to define the region of the object or item to be tagged. The bounding box can include some of the area outside the item of interest in order to allow for some inaccuracy in user selection due to the size of a touch screen or other such limitation. The interface can also provide an interface element 306 such as a modal window or secondary panel that includes one or more options for locating or selecting information to be utilized with the tag. In this example, a text box is displayed that enables a user to enter information to be used in searching for an item, such as an item (e.g., a product, service, or electronic file) offered for consumption (e.g., purchase, rent, lease, or download) through an electronic marketplace or advertising offered through an advertising entity, among other such options. In other embodiments, image or text recognition might be used (at least for images) to attempt to identify an object in the image and provide suggested text and/or related content. In some embodiments, content can be pre-processed to indicate images where objects are recognized and tags might be appropriate. In FIG. 3(*b*) the provider has entered information for the camera in the image and the system has located potential matches, as may be located in an electronic catalog associated with the electronic marketplace, on a third party Web site, or in other such locations. Another view of the window 324 associated with the tagged image 322 can include information 326 for one or more matching items, from which the user can select. Although a product name is shown, it should be understood that any appropriate content could be provided, such as may include "camera" or "Acme camera." As illustrated in FIG. 3(*c*), the interface then can provide a view 340 including the information 344 for the selected item as it will appear in an interface element 342 associated with the tagged image 322. If the provider is satisfied with the selection, the provider can confirm the selection. When the provider comes back to the content, the provider can see different options when interacting with tagged content, such as options to edit or delete the tag and/or association. When a user subsequently interacts with the image, such as by hovering a cursor over the image or touching the image via a touch screen, the interface element 342 with the selected content 344 can be displayed to the user. The user then can have options such as to view more information for the item, purchase the item, visit a site offering the item, etc. For any or all of these options, the publisher can potentially receive monetary or other compensation from a party such as a provider of the marketplace, provider of the item, advertising entity, etc.

Figure 4:
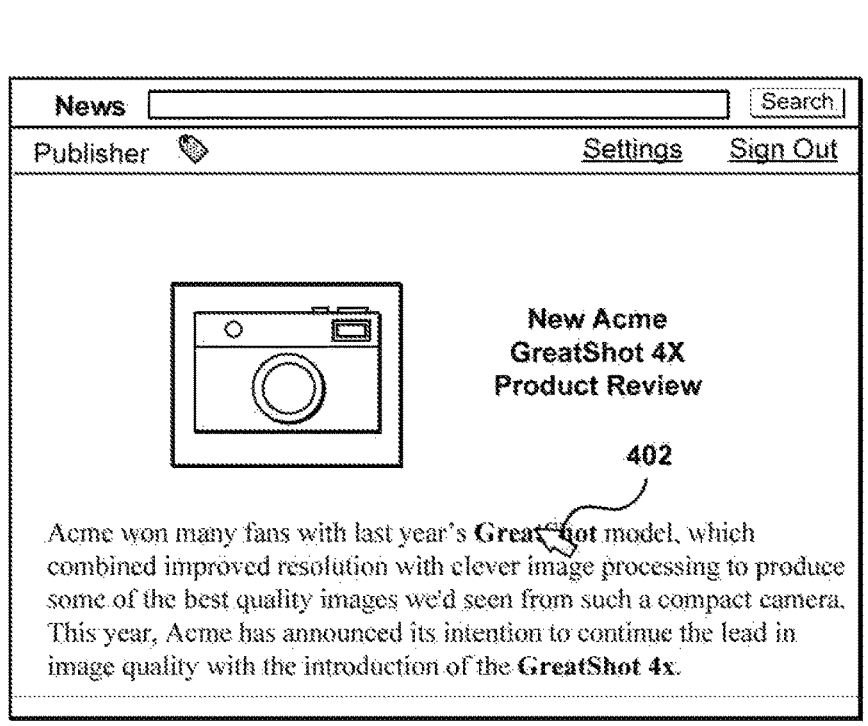
FIG. 4 illustrates an interface including a publishing bar enabling the publisher to tag other types of content elements in the example content.

FIG. 4 shows another approach for an interface view 400, wherein the provider is able to select one or more terms or words for which to set a tag. When a user subsequently interacts with that term, as with the image described previously, the user can view the information for the tag. In this example, the service has processed the text in advance to recognize words that match products offered through an associated marketplace, such that the publisher after selecting an element of the publisher bar (or another such option) can select one of those words (or a different word, character, or phrase) and see options for items matching that word 402.

Figure 5:
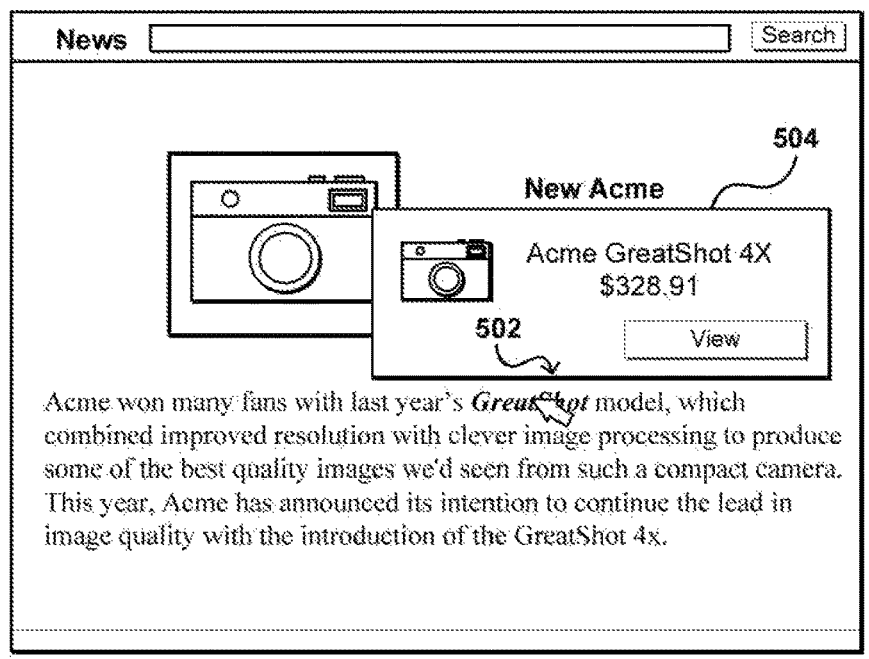
FIG. 5 illustrates an interface enabling a user to view information associated with a tagged content item in accordance with various embodiments.

Then, as illustrated in the view 500 of FIG. 5, when a user interacts with that word 502 or element of the content, the related information 504 can be displayed. The tagged element can be highlighted or indicated using any appropriate mechanism, such as bold text, an asterisk, etc.

Figure 6:
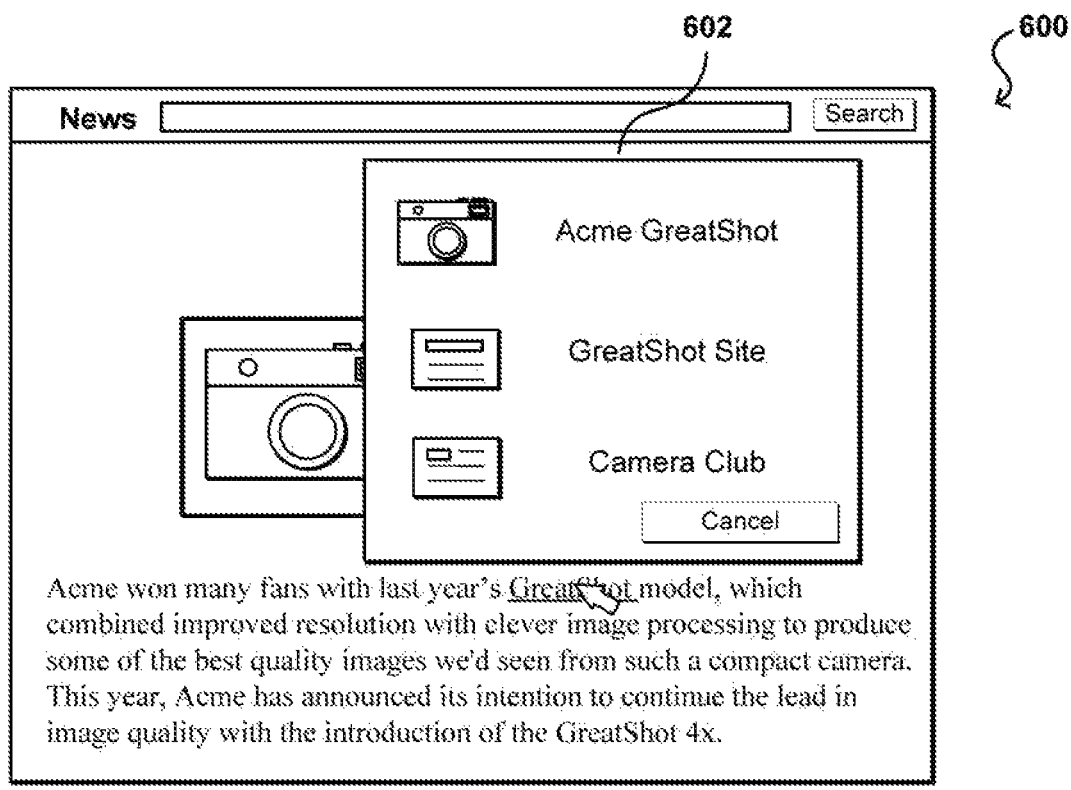
FIG. 6 illustrates an interface enabling a user to view information associated with a tagged content item in accordance with various embodiments.

In some embodiments the provider does not have to select a specific product, but can select content elements determined to have related options. For example, in the view 600 of FIG. 6, the provider selected a term that has related products or content, but may not have specified a particular instance of content. When a user subsequently interacts with that term in the content, the user can see a view 602 of content related to that term (here including a product, a Web page, and a portion of a social networking site), the selection of any of those instances by the user resulting in the publisher receiving appropriate compensation. In some embodiments the publisher might have specified one or more instances of content, but the system might show additional instances. In some embodiments, the system might have the authorization to change the instance of content linked to a tagged term or image, for example, such as to show the latest version, a similar but more recommended item, etc. Further the types of additional suggestions can vary, as a publisher might link a product or advertisement but the additional (or replacement) content instances shown might include links to Web pages, applications, etc. The suggestions can also be selected based at least in part upon various types of contextual information, which can result in different instances being shown to different users for the same tag, or different instances being shown to the same user at different times and/or locations. In at least some embodiments, the content instance(s) shown for a tag can be determined at approximately the time of rendering the main content, or the interaction with a tagged content element, allowing for dynamic determinations for tag associations. Tag determinations and/or associations can be based on information such as user behavior or profile information, location, time of day, time of year, other links or content on the page, content viewed or accessed by others accessing that content, etc. Such an approach enables the linked content to be updated over time, and to provide content that will likely be more relevant to the user at the time of presentation. In some embodiments, users can also create or suggest tags or links for tags, and can provide feedback when tags or links are incorrect or inappropriate, etc. In some embodiments, the system can recognize content that has been tagged and can provide appropriate information depending upon how much of the content is shown in a current view, the size or resolution of the display for the content, and other such information. The system can also monitor how often tags or links are followed, result in revenue generation, etc., and can remove or add tags based at least in part upon this information, as the number of ads might be kept to a minimum to improve user experience, and only tags that perform to at least a certain level over time might remain in the content.

Figure 7:
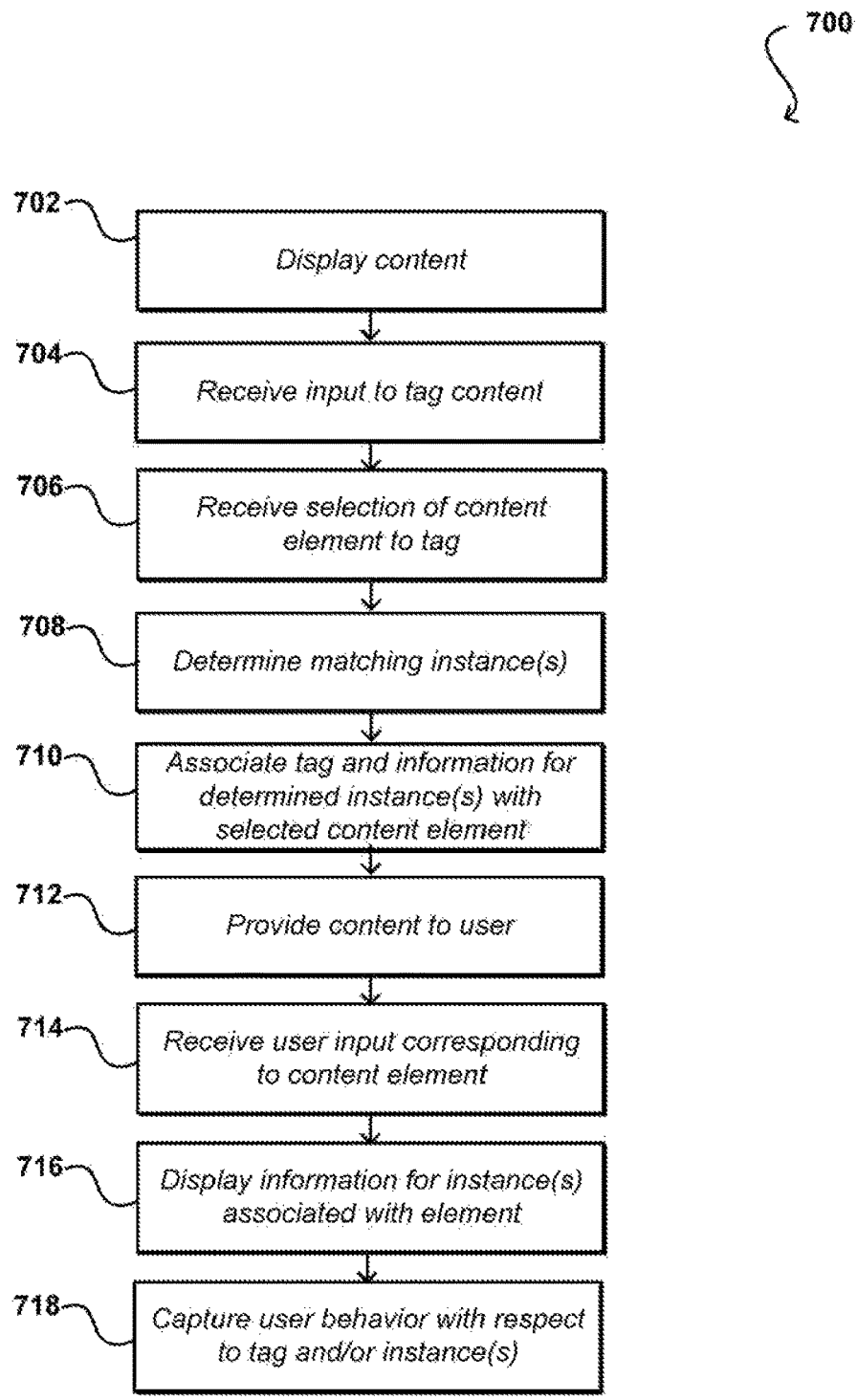
FIG. 7 illustrates an example process for associating and displaying information with a content element that can be utilized in accordance with various embodiments.

FIG. 7 illustrates an example process 700 for tagging content elements for advertising that can be utilized in accordance with various embodiments. It should be understood that there can be additional, fewer, or alternative steps performed in similar or alternative orders, or in parallel, within the scope of the various embodiments unless otherwise stated. In this example, content is displayed 702 to an entity such as a publisher or content provider. Input can be received 704 indicating that the entity selected an element to enter a tagging mode or other such state. A selection of a content element then can be received 706, indicating the content element to be tagged. Information for one or more instances of content can be determined 708, such as by searching through a product catalog of an electronic marketplace or advertisements offered by an advertising entity, browsing an index of Web pages or social networking sites, etc. Information for at least a portion of those instances can be automatically selected and/or presented to the entity, whereby a selection of one of those instances might be received. Information for determined instances, and appropriate tagging data, then can be associated 710 with the designated content element. When the content is subsequently provided 712 for display to a user, the tagging data can be provided. When user input corresponding to the content element is received 714, the information for the associated instance can be caused to be displayed 716 to the user. The user can then have various options with respect to the instance and/or information, at least a portion of which can result in compensation to the entity. In at least some embodiments, information about the user's interaction with the tag and/or instance can be captured 718, in order to perform tasks such as to determine the performance of the tag and update future tag associations, etc.

The ability to tag content elements, such as text or images, with associated information will be referred to herein as in-text and in-image linking, respectively. Approaches discussed herein provide for such linking in a scalable, extensible, and globalized manner. A publishing toolkit such as that described also allows for easy productizing or monetizing of content, using a platform that is site safe (e.g., works across multiple applications and technologies), is scalable, has relatively low latencies (e.g., less than 100 milliseconds), can provide for secure authentication and other such functionality, and can utilize common scripting approaches such as JavaScript. Certain embodiments also enable the sharing of products outside, for example, the environment of an electronic marketplace.

Various scenarios can be supported. For example, in-image ads can allow a content provider to link parts of the provider's images to product identifiers of an electronic marketplace, and advertisements for the related products can be displayed when end-users browsing the content hover over the images to know more information. A provider can, for example, link to the exact skirt, hat, or earring that a model is wearing in an image, which can help consumers easily identify these branded apparel or accessories and purchase from the marketplace, which can result in compensation for the content provider. A similar scenario provides for in-text ads, where providers can focus on the content while writing and worry about link building to the marketplace or advertising entity at a later point in time. Also, providers may like to have a simple and easy way to create these links, right from their websites or systems, for example, rather than searching for a given product or advertisement each time. With a publisher toolkit, or other such offering discussed or suggested herein, content providers can continue to write uninterrupted and, when the page goes live, the provider can simply select the relevant text (or images) in their article and link back to specific products, services, or advertisements, etc. These links then can be presented to end-users as pop-over preview ads, for example, in addition to being linked back to the corresponding information. This not only helps provider the publisher with easy content writing and link building, but also better monetizes their content in a non-intrusive manner.

A scenario supported by various embodiments allows for the triggering of viral social marketing campaigns. In addition to conventional options for ads such as obtaining more information or purchasing a products, customers can have options that relate to social media platforms. Consumers can interact with the ads in newer ways, as a consumer or end-user can "like" or recommend a product, which can cause information for that product to be posted on a social networking site. An end user can also share information about the product, indicate that they own or want the product, etc. Once shared via social media, these influence the buying decisions of the community, which in turn now drives traffic to the electronic marketplace or ad provider, and can result in compensation for the content provider.

As indicated, in some embodiments the functionality can be offered through a publisher toolbar that will be displayed to a user validated as a publishing entity, or other such user. One such toolbar can include features such as sign-in and sign-out, add or edit tags, edit settings, report problems, access help, etc. The toolbar can include functionality to identify whether the user accessing the content is the actual publisher, and if so can display the toolbar in minimized or maximized fashion, for example, as may be based on previous settings of the publisher. The publisher can have the option to minimize or hide the toolbar at any time, among other such options.

The toolbar can be the starting point for adding or editing tags, as mentioned above. In an example workflow, a publisher clicks on the word "Tag" on the toolbar. This puts the page on "Edit" mode. On Edit mode, the content (e.g., image and/or text) that can be tagged can be displayed, and the rest of the content that cannot be tagged can be "grayed out" or otherwise designated. For example, images below a designated size (e.g., 1×1 beacons, small thumbnails, etc.), might not be allowed to be tagged. The publisher then can select parts of an image or text, and the product finder "search" widget will pop-over. The publisher then can search and select a specific product, whereby an image hotspot can be created or parts of the text selected, then mapped to the associated information, such as a product identifier. When the end user loads the page, the user can start accessing these ads.

In at least some embodiments, at least some level of discoverability for end-users can be required. There may not be tagged images on every website, for example, hence expecting users to mouse-over and see in-image ads cannot be expected. To address this, tagged links might be marked separately, such as with a designated colored border and/or with a pulsating (e.g., live images with heartbeat) but non-intrusive animation to show tagged images. On first mouse-over or initial load time, all the ads on the page might appear and then disappear after some time, to indicate to the user that ads or tags exist there. The next time the user may be inclined to mouse-over and only specific content related to the relevant content item might be displayed. These options should not be intrusive, however the user can have an option to customize or turn off such display.

When editing image links, editable images can be shown separately. All the content elements that cannot be tagged can be designated as discussed, or the interface can show an option such as "Tag Element" over each element that can be tagged, among other such options. To edit or remove a link, the publisher can click on elements such as "remove link" and "edit link" buttons that appear beneath the ad pop-over. Upon edit, the search widget can be removed and the tag deleted. Editing an image can edit the links on all its instances, wherever the image shows on the publisher website or related location. Multiple links can be created one over the other. In at least some embodiments it can be up to the publisher to add links in a proper way. Various types of images (e.g., JPG (JPEG), PNG, GIF, or BMP) can be supported, while types of elements such as flash elements or PDF documents might be ignored. When building links, there can be an ability to preview the links and changes saved for publishing when completed. In at least some embodiments multiple links cannot be created for the same text element. If someone selects another link, the system can show the old ad preview with edit and/or remove options, etc.

A search widget or product finder can be displayed whenever a content element such as an image map or text is selected. In the search box, the system can pre-fill the search box with the selected text for text links, and automatically kick-off the search. The entire pre-filled text can be in highlight mode, so that the publisher can still just type over it to search for a new string, without having to spend extra mouse clicks/keyboard strokes to clean up the search text box. In addition to product information, for example, the associated information can also relate to categories of items, search pages, brand pages, external advertising, etc.

There can be restrictions on ads in at least some embodiments, such as where the ads are to be aesthetically pleasing and as non-intrusive as possible, while presenting the right set of information about a product. The ad in at least some embodiments should look compact and as small as possible, though without looking cramped for space. The elements of the ad can vary, as may include product information and various user actions in at least some embodiments. This can include information such as an image and title of a product, along with description, customer ratings, and the like. The user actions can include a purchase option and/or one or more social media options, as discussed. The information can also include any appropriate legal, branding, and/or privacy information, as may include the word "Privacy" and a link to an opt-out page.

In some embodiments users can set various preferences, such as for the colors or formats of pop-overs. Users can build preferences on the toolbar and save these. While creating links, the developer can choose the preference type to use, which can be exposed on the product finder pop-over, above the search box in at least some embodiments. Irrespective of the tagged image discoverability problem is addressed, the publisher can be empowered to customize the look and feel of various effects, or even turn-off all effects. For debugging purposes, publishers can be allowed to turn-off in-image/in-text ads for some period of time.

As mentioned, the publishing tool functionality can include the collection of various metrics and/or generation of various reports. These metrics can include, for example, number of impressions, click-through-rate, number of clicks, conversion information, number of items ordered, number of items shipped, advertising fees, and other information known or used for monitoring aspects of advertising. Reports can include metrics such as number of page impressions, number of mouse-overs on an image, number of mouse-overs on an ad, number of clicks, click-through-rate, units, conversion information, earnings, profits, etc. The system can also show the performance metrics (as captured above) per each image tagged. That way the publisher knows which images convert better than others. In some embodiments a summary report can be shown for overall associate metrics (not just publisher tool), with data such as impressions, clicks, conversion, and earnings. There can also be an option on the summary report to show the entire as an overlay on the publisher site, to see more details, etc.

There can be various security considerations. A publisher interested in trying out the service can to enter his account information and accept the terms of use shown (only once). In the next step, the publisher can be provided with script to add to a Website, instances of content, or anywhere the publisher wants the functionality to be available. Once that is done, the publisher can select a "Start verification" or similar option. The provider of the tool can then verify if the associate is the real publisher owning the site and tie the associate and publisher account information. The next time the publisher comes to the website, the tool can read the information (e.g., a cookie) and identify the publisher to put the tool in edit mode. All authentication and publisher facing flows might be offered only via a secure connection.

Various other functionality can be offered as well within the scope of the various embodiments. For example, tagging of images based on visual similarities can be supported. For example, a blogger can add an image of an item, and the publisher tool can crawl the text and image to makes product references or suggestions. In some embodiments, product and hotspot information can be embedded into the image metadata. A repository of "tagged" images which already have product references and can be used in any page can be provided, which is accessible through the publisher tool. In at least some embodiments, the tag information can be rendered differently on tablets and mobile devices than notebook computers or other such devices. In some embodiments, the toolbar can be embedded in a page to help tag text and images (not as a control panel and not in the browser), with ads then delivered dynamically.

Figure 8:
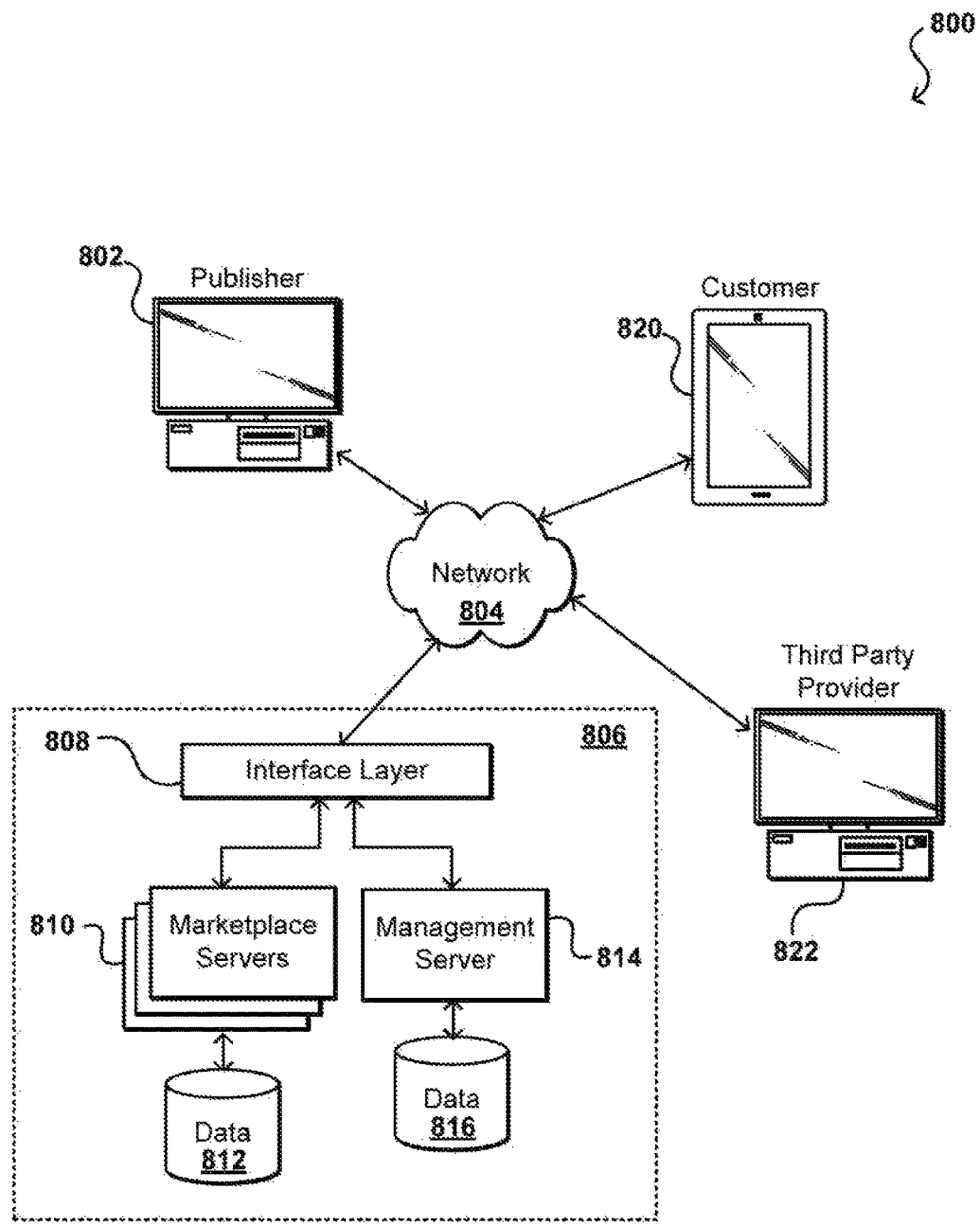
FIG. 8 illustrates an interface environment in which various embodiments can be implemented.

FIG. 8 illustrates an example of an environment 800 in which various aspects of the embodiments can be implemented and/or utilized. In this example, a content publisher 802 is able to use a computing device 802 to tag content using a publisher tool as discussed herein. The publisher tool can access information from a provider environment 806 over at least one wired and/or wireless network, such as the Internet, an Intranet, a cellular network, a local area network (LAN), and the like. In at least some embodiments, a request from the tool for information will be received to an interface layer 808 of the provider environment 806, which can determine that the request is a request for content from the electronic marketplace and can direct information for the request to one or more appropriate marketplace servers 810 configured to analyze the request and return product data, for example, enabling the publisher's computing device 802 to display content for at least one item corresponding to the request, which then can be associated with one or more content items. In at least some embodiments, the marketplace servers can pull data from one or more data stores 812, wherein those data stores can include information about the item, page content, information about the publisher and publisher preferences, and other such information. The marketplace servers 810 and/or components of the interface layer, as may include one or more Web servers or other such components, can cause the content to then be sent to the publisher's computing device 802 for presentation to the publisher. Approaches for receiving requests, such as Web page requests, and serving content, such as Web pages, to a computing device are well known in the art and, as such, will not be discussed herein in detail. The publisher can also submit requests relating to the account of the publisher with the provider of the electronic marketplace, which can be received by an interface, such as an application programming interface (API), of the interface layer 808. The interface can cause information for the request to be routed to a management server 814 or other such component or service configured to manage aspects of the publisher account, such as accounting data, performance data, and the like. The information for the publisher's account can be stored in at least one data store 816, which can be the same as, or at least partially separate from, the marketplace data store 812. The information for a tag can also be associated with a third party provider computing system 822, such as to pull related advertising or other such content. The content for the tag then can be displayed through a computing device 820 of an end-user or customer interacting with the tagged content element.

Figure 9:
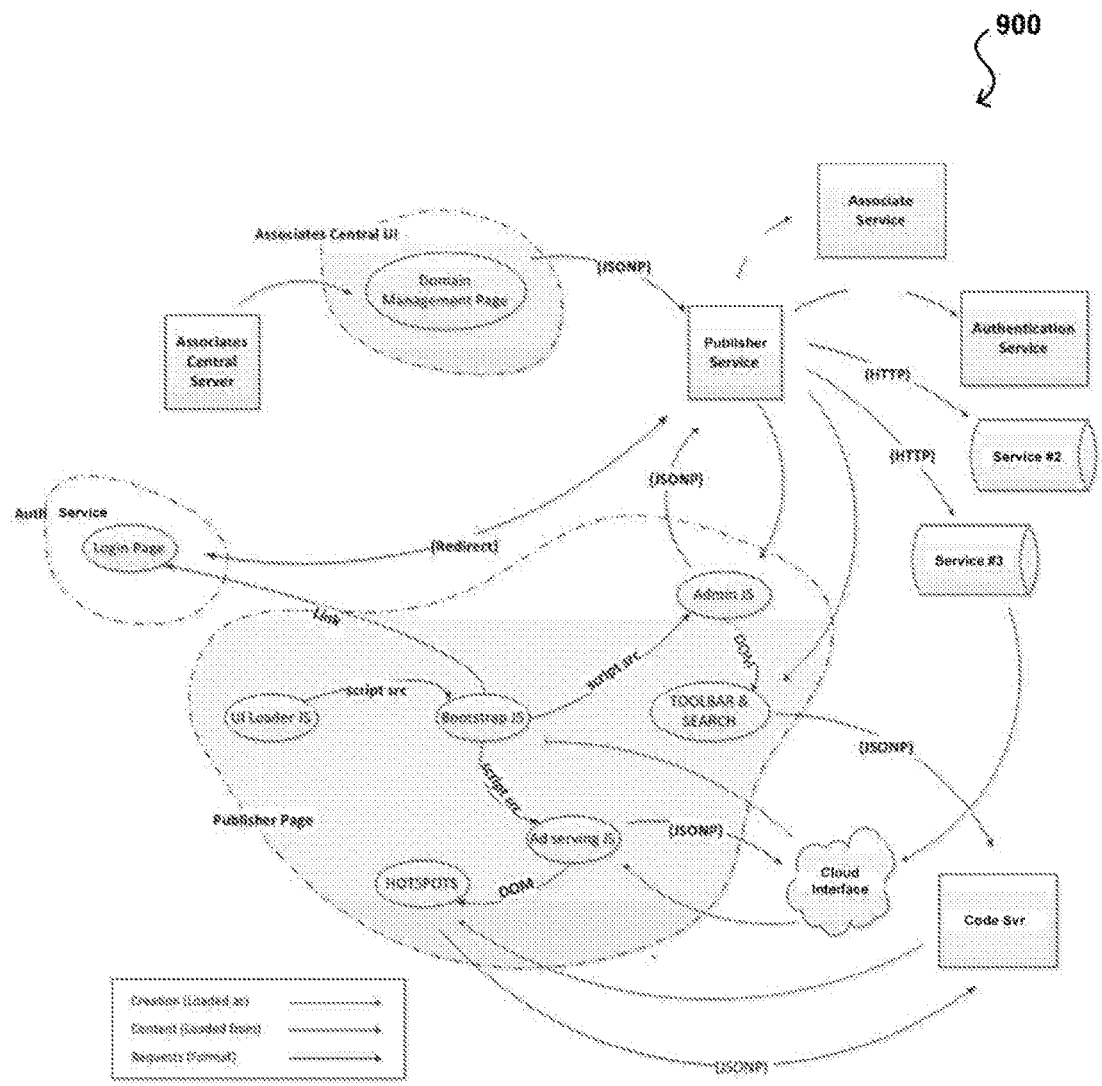
FIG. 9 illustrates an example process flow that can be utilized in accordance with various embodiments.
Figure 10:
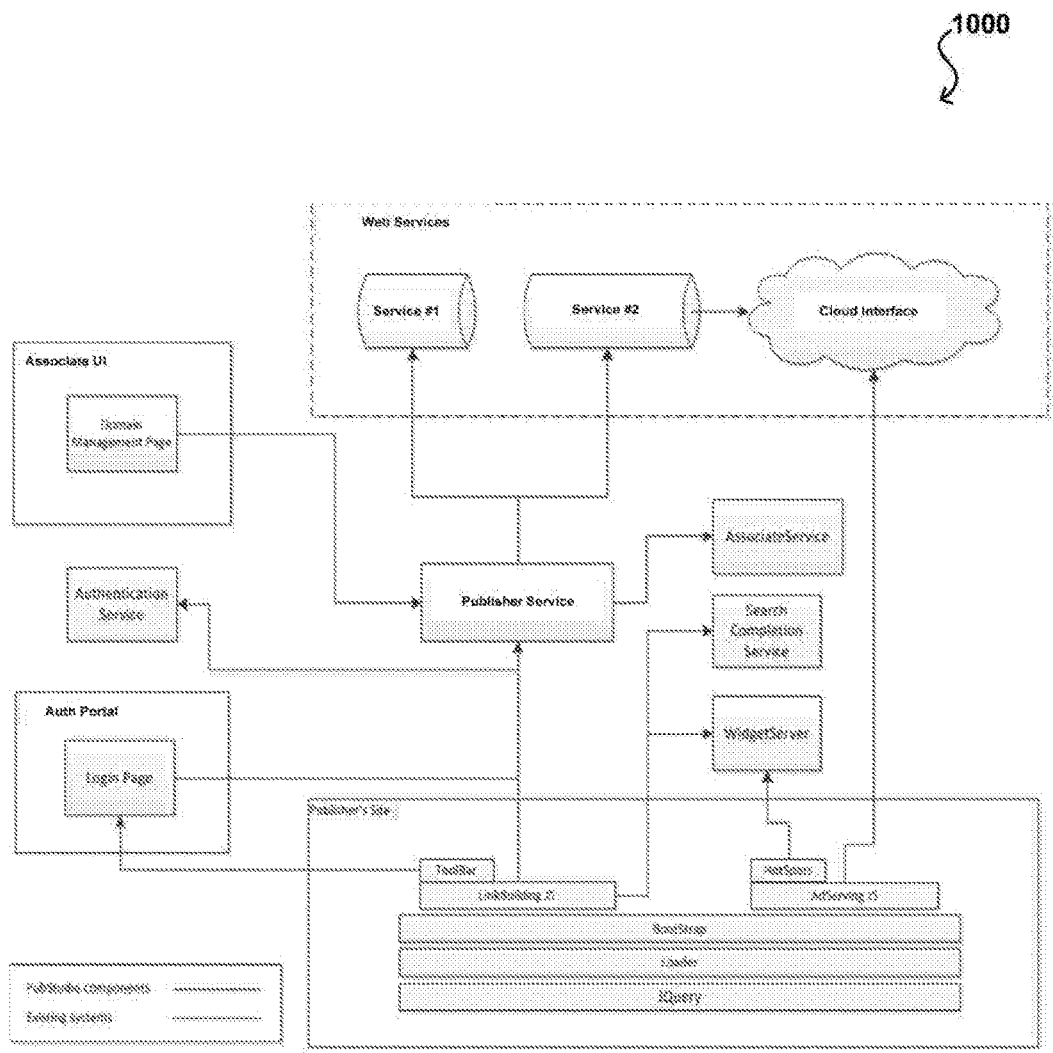
FIG. 10 illustrates an example data flow that can be utilized in accordance with various embodiments.

FIG. 9 illustrates an example flow 900 for a process in accordance with various embodiments. As illustrated, a publisher service can interact with various other services or entities, such as an associate UI, a publisher page, an authentication portal, and other such components. FIG. 10 illustrates a similar flow 1000 for such an environment, wherein steps are performed similar to those discussed above with respect to FIG. 7.

Figure 11:
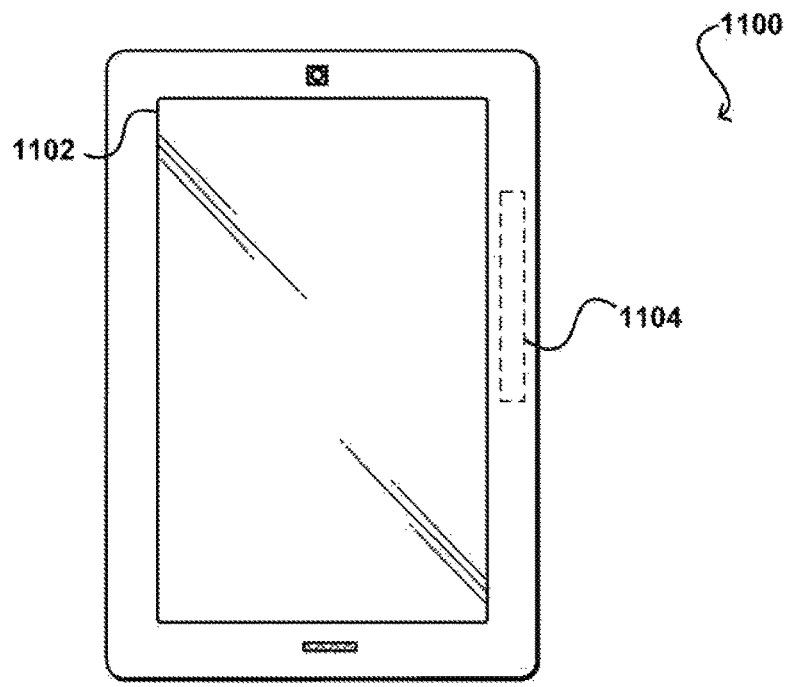
FIG. 11 illustrates an example device that can be used to implement aspects of the various embodiments.

FIG. 11 illustrates an example electronic user device 1100 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 1100 has a display screen 1102 on the front side, which under normal operation will display information to a user facing the display screen (e.g., on the same side of the computing device as the display screen). It should be understood that computing devices such as servers, however, may not have dedicated display elements. The example computing device 1100 also includes at least one networking component 1104, such as a network interface card, wireless networking component, and the like, enabling the computing device to communicate information over at least one network.

Figure 12:
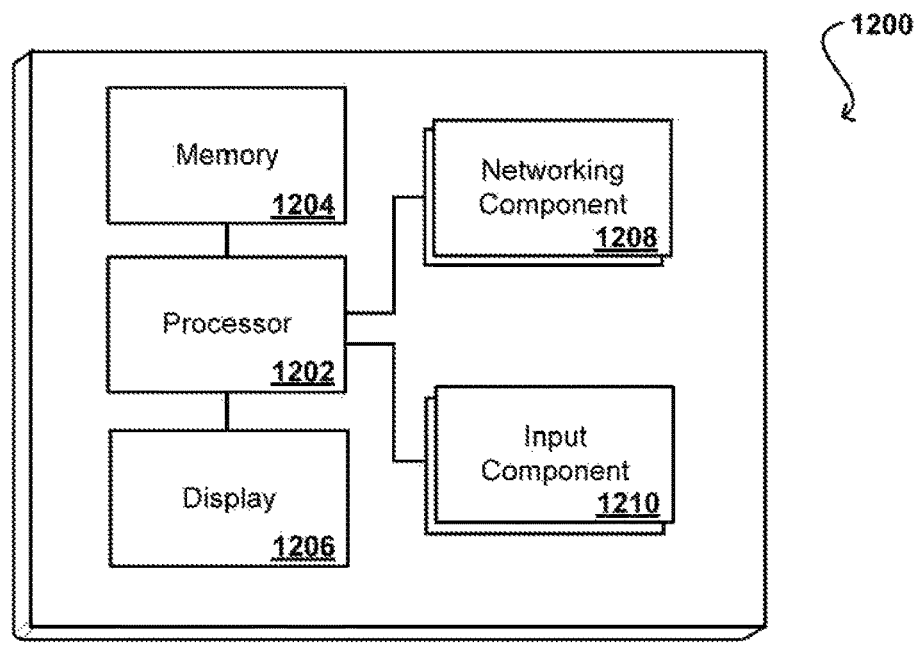
FIG. 12 illustrates example components of a client device such as that illustrated in FIG. 11.

FIG. 12 illustrates a logical arrangement of a set of general components of an example computing device 1200 such as the device 1100 described with respect to FIG. 11. In this example, the device includes a processor 1202 for executing instructions that can be stored in a memory device or element 1204. As would be apparent to one of ordinary skill in the art, the device can include many types of memory, data storage, or non-transitory computer-readable storage media, such as a first data storage for program instructions for execution by the processor 1202, a separate storage for images or data, a removable memory for sharing information with other devices, etc. The device typically will include some type of display element 1206, such as a touch screen or liquid crystal display (LCD), although devices such as portable media players might convey information via other means, such as through audio speakers. In some embodiments, the computing device 1200 of FIG. 12 can include one or more networking and/or communication elements 1208, such as a Wi-Fi, Bluetooth, RF, wired, or wireless communication system. The device in many embodiments can communicate with a network, such as the Internet, and may be able to communicate with other such devices. In some embodiments the device can include at least one additional input component 1210 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

Figure 13:
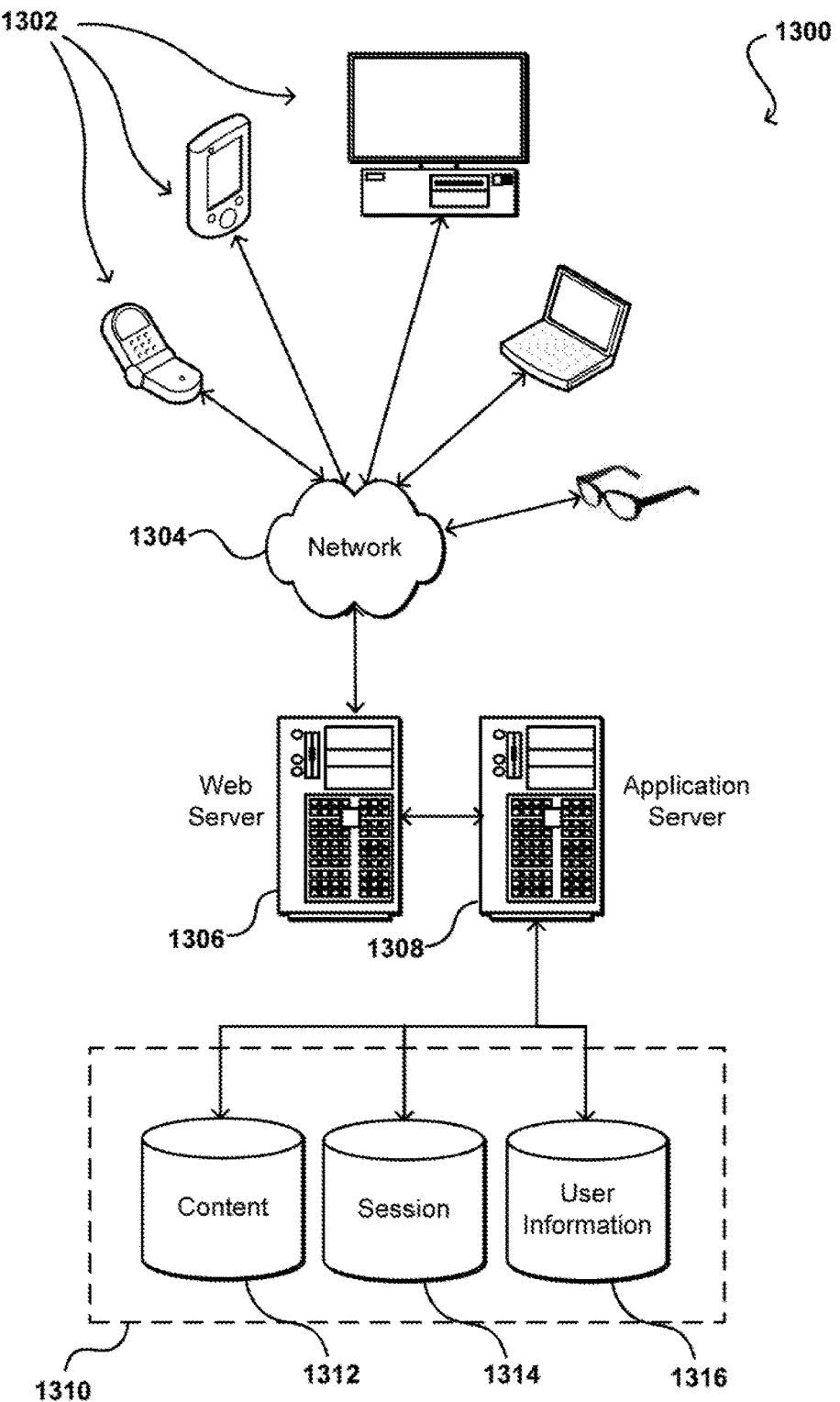
FIG. 13 illustrates an environment in which various embodiments can be implemented.

As discussed, different approaches can be implemented in various environments in accordance with the described embodiments. For example, FIG. 13 illustrates an example of an environment 1300 for implementing aspects in accordance with various embodiments. As will be appreciated, although a Web-based environment is used for purposes of explanation, different environments may be used, as appropriate, to implement various embodiments. The system includes an electronic client device 1302, which can include any appropriate device operable to send and receive requests, messages or information over an appropriate network 1304 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1306 for receiving requests and serving content in response thereto, although for other networks an alternative device serving a similar purpose could be used, as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1302 and the application server 1308, can be handled by the Web server 1306. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 1302. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a selection corresponding to a content instance for association with a content element displayed on a display of a first computing device;
   receiving a query for the content element from a second computing device;
   determining context information associated with the second computing device, the context information being updateable in accordance with time-based changes;
   displaying the content element with at least a visible marking and the content instance on the second computing device; and
   displaying, upon user interaction with the content element, an updated content instance including context-based tagging content corresponding to the context information, thereby providing time-based content, in the updated content instance, at the time of the user interaction on the second computing device.

2. The computer-implemented method of claim 1, wherein the content element is part of at least one of a page of text, a web page, a video, or an application interface.

3. The computer-implemented method of claim 1, further comprising:
   displaying information for the content instance and the context-based tagging content to a second user when the second user interacts with the content element.

4. The computer-implemented method of claim 3, further comprising:
   determining, for the displaying information in response to the second user interacting with the content element, at least another content instance of one or more instances of content.

5. The computer-implemented method of claim 1, further comprising:
   exposing display functionality through an application interface, the display functionality included for one or more instances of content for tagging and comprising a sign-in functionality, a sign-out functionality, a tag-adding functionality, a tag-editing functionality, and a tag-setting functionality.

6. The computer-implemented method of claim 5, wherein a content provider provides the content element and the application interface.

7. The computer-implemented method of claim 5, wherein the context information is determined in response to detecting that an input from the second computing device indicating an interaction with the content element.

8. The computer-implemented method of claim 5, wherein the context information is determined based at least in part on at least one of user behavior data, user profile data, user location data, time data, and relevant content data.

9. A computer system, comprising:
   at least one processor; and
   memory including instructions that, when executed by the at least one processor,
   cause the computer system to:
   receive a selection corresponding to a content instance for association with a content element displayed on a display of a first computing device;
   receive a query for the content element from a second computing device;
   determine context information associated with the second computing device, the context information being updateable in accordance with time-based changes;
   display the content element with at least a visible marking and the content instance on the second computing device; and
   display, upon user interaction with the content element, an updated content instance including context-based tagging content corresponding to the context information, thereby providing time-based content, in the updated content instance, at the time of the user interaction on the second computing device.

10. The computer system of claim 9, wherein the content element is part of at least one of a page of text, a web page, a video, or an application interface.

11. The computer system of claim 9, wherein the memory including the instructions that, when executed by the at least one processor, further cause the computer system to:
    display information for the content instance and the context-based tagging content to a second user when the second user interacts with the content element.

12. The computer system of claim 11, wherein the memory including the instructions that, when executed by the at least one processor, further cause the computer system to:
    determine, for the displaying information in response to the second user interacting with the content element, at least another content instance of one or more instances of content.

13. The computer system of claim 9, wherein the memory including the instructions that, when executed by the at least one processor, further cause the computer system to:
    expose display functionality through an application interface, the display functionality included for one or more instances of content for tagging and comprising a sign-in functionality, a sign-out functionality, a tag-adding functionality, a tag-editing functionality, and a tag-setting functionality.

14. The computer system of claim 13, wherein a content provider provides the content element and the application interface.

15. A non-transitory computer-readable storage medium including instructions that, when executed by a processor of a computing device, cause the computing device to:
- receive a selection corresponding to a content instance for association with a content element displayed on a display of a first computing device;
- receive a query for the content element from a second computing device;
- determine context information associated with the second computing device, the context information being updateable in accordance with time-based changes;
- display the content element with at least a visible marking and the content instance on the second computing device; and
- display, upon user interaction with the content element, an updated content instance including context-based tagging content corresponding to the context information, thereby providing time-based content, in the updated content instance, at the time of the user interaction on the second computing device.

16. The non-transitory computer-readable storage medium of claim 15, wherein the content element is part of at least one of a page of text, a web page, a video, or an application interface.

17. The non-transitory computer-readable storage medium of claim 15, wherein the instructions when executed further cause the computing device to:
- display information for the content instance and the context-based tagging content to a second user when the second user interacts with the content element.

18. The non-transitory computer-readable storage medium of claim 17, wherein the instructions when executed further cause the computing device to:
- determine, for the displaying information in response to the second user interacting with the content element, at least another content instance of one or more instances of content.

19. The non-transitory computer-readable storage medium of claim 15, wherein the instructions when executed further cause the computing device to:
- expose display functionality through an application interface, the display functionality included for one or more instances of content for tagging and comprising a sign-in functionality, a sign-out functionality, a tag-adding functionality, a tag-editing functionality, and a tag-setting functionality.

20. The non-transitory computer-readable storage medium of claim 19, wherein a content provider provides the content element and the application interface.

* * * * *